(12) United States Patent
Shah et al.

(10) Patent No.: US 6,442,384 B1
(45) Date of Patent: Aug. 27, 2002

(54) SYSTEM AND METHOD FOR IDENTIFICATION OF UPLINK/DOWNLINK INTERFERENCE SOURCES

(75) Inventors: Ali R. Shah, Dallas; Hossam H'mimy, Plano, both of TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/426,139

(22) Filed: Oct. 22, 1999

(51) Int. Cl.$^7$ ................................................. H04Q 7/20
(52) U.S. Cl. ........................ 455/423; 455/63; 455/67.3; 455/501; 455/62; 455/64; 455/424; 455/283; 455/296
(58) Field of Search ........................... 455/423, 62, 63, 455/64, 67.3, 424, 283, 293, 501

(56) References Cited

U.S. PATENT DOCUMENTS

| | | | | |
|---|---|---|---|---|
| 4,180,708 A | * | 12/1979 | Yamaguchi et al. | 179/2 |
| 5,179,722 A | * | 1/1993 | Gunmar et al. | 455/33.1 |
| 5,355,514 A | * | 10/1994 | Borg | 455/33.1 |
| 5,402,523 A | * | 3/1995 | Berg | 455/33.4 |
| 5,596,570 A | * | 1/1997 | Soliman | 370/252 |
| 5,768,260 A | * | 6/1998 | Lindgren et al. | 370/252 |
| 6,009,324 A | * | 12/1999 | Pravitz et al. | 455/423 |
| 6,223,031 B1 | * | 4/2001 | Naslund | 455/423 |
| 6,330,428 B1 | * | 12/2001 | Lewis et al. | 455/67.1 |
| 6,332,076 B1 | * | 12/2001 | Shah et al. | 455/423 |
| 6,349,207 B1 | * | 2/2002 | Monot et al. | 455/423 |
| 6,356,758 B1 | * | 3/2002 | Almeida et al. | 455/446 |
| 6,360,094 B1 | * | 3/2002 | Satarasinghe | 455/423 |

* cited by examiner

*Primary Examiner*—Daniel Hunter
*Assistant Examiner*—Stephen M. D'Agosta
(74) *Attorney, Agent, or Firm*—Godwin Gruber, P.C.; Arthur I. Navarro

(57) ABSTRACT

A system and method of identifying the source of uplink and downlink interference in a disturbed cell of a wireless telecommunications network. Initially, call events occurring in offending cells are recorded. In conjunction, the disturbance events occurring in the disturbed cell of the telecommunications network are recorded. The recorded call events with recorded disturbance events are then correlated. A distribution of disturbed and offending cells within the telecommunications network as a function of time is computed to obtain a statistical correlation of call events in offending cells and subsequent disturbances resulting in the disturbed cell to identify the possible source of disturbances that caused the sealing of the sealed device with in the disturbed cell.

30 Claims, 3 Drawing Sheets

SYSTEM AND METHOD FOR IDENTIFICATION OF UPLINK/DOWNLINK INTERFERENCE SOURCES

TECHNICAL FIELD

This invention relates in general to wireless telecommunications networks and applications and, in particular, to a method and system of identifying and analyzing the source of uplink/downlink interference in a disturbed cell of a wireless telecommunications network. More particularly, the invention relates to methods of identifying sources of interference that can cause a device to seal or voice quality to degrade, making it unavailable for use in the network.

BACKGROUND OF THE INVENTION

Without limiting the scope of the invention, its background is described in connection with identifying and analyzing downlink interference in a wireless telecommunications network, as an example.

Present-day mobile telephony has spurred rapid technological advances in both wireless and wireline communications. The wireless industry, in particular, is a rapidly growing industry, with advances, improvements, and technological breakthroughs occurring on an almost daily basis. Many mobile or wireless telecommunications systems, among them the European GSM-system, have passed through several generations of advancements and development phases, and system designers are now concentrating on further improvements to such systems, including system refinements and the introduction of optional subscriber services.

Most wireless telecommunication systems are implemented as cellular telephone networks wherein a group of Base Transceiver Stations (BTS), or base stations are served by a centrally located switch. The switch is commonly referred to as a Mobile Switching Center (MSC). The base stations are spaced apart from each other by distances of between one-half and twenty kilometers. Each base station is assigned a number of two-way voice and control channels. The voice channels transmit voice signals to and from proximately located mobile stations, and transmit control information to and from these mobile stations, usually for the purpose of establishing a voice communications link.

A typical cellular telephone network also includes a group of interconnected MSCs, which operate in association with a gateway mobile switching centerthrough which the cellular telephone network interconnects with a conventional Public Switched Telephone Network (PSTN). In addition, at least one Home Location Register (HLR) operates within the cellular telephone network. The HLR stores network subscriber information, including the identified location of current mobile stations within the network.

In response to an incoming call placed to a mobile station, the MSC queries the HLR to determine the current location of the station. The HLR "looks up" the current location of the mobile station and contacts the currently serving MSC to pre-route the call and retrieve a temporary location directory number, which is utilized to route the call through the telecommunications network for termination of the call to the mobile station. The MSC instructs the base station serving the cell in which the mobile station is located to page the mobile station. Responding to the page, the mobile station requests assignment of a channel, and the network terminates the call through the serving MSC and over the assigned channel.

Calls by mobile subscribers can be affected by interference which can cause radio disturbance events which, in turn, limit the efficiency of the network. As such, it is important to identify those cells within the network, which are sources of and subject to radio disturbance events. Interference itself can be either external or internal to radio network. The internal interference results from call activities within a network cell site. It is appropriate to term of cells as either "offending" or "disturbed." A radio disturbance event typically occurs during a cellular call, either on the downlink (from a base station to a mobile station) or on the uplink (from a mobile station to a base station). The mobile phone is also called a "portable" or "cellular phone". The disturbance event can be limited to several types of interference, including co-channel interference, adjacent channel interference or external interference.

Various methods exist for determining when a cell has been disturbed. Typically, a comparison of signal strength versus a measurement of speech quality can be employed to determine the Bit Error Rate (BER) of the transmission channel. When sufficient signal strength is correlated with degraded speech quality for an extended period of time (usually measured in seconds) that cell can be considered "disturbed." Failure to identify and analyze sources of such disturbances could result in poor channel quality and the sealing of devices which means they are unavailable for use in handling calls.

Various methods and systems currently exist for identifying disturbed cells within the wireless telecommunication networks. One of the most widely utilized methods involves downlink interference prediction tools, or prediction methods which use model-based prediction algorithms. Such tools predict where interference may exist within a given network coverage area. The predictions are then utilized for frequency and cell planning, particularly in initial network designs. The validity of such predictions is dependent on a number of factors, including the accuracy of the propagation model utilized, the resolution of the terrain data, and so forth. Such tools are helpful in identifying the cells that are causing downlink interference, but taken together are often inaccurate because of the dependence on predictions. That is, such prediction tools do not always account for "real-life" sources of interferences in the coverage area as determined through more empirical measurement methods.

Another method utilized to identify disturbed and offending cells involves drive testing by field personnel. The drive test can be performed by turning off all adjacent/co-channel transmitters for a particular disturbed cell and then keying up each transmitter individually. A drive test team, in the meantime, drives the area in a motorized vehicle to observe and measure interference within the drive area. This method is inherently labor intensive and costly. In addition, the drive-test approach, while sometimes useful, does not take into account variations in mobile station types and can be quite expensive since it requires continuous measurement by field personnel. It also limits the possible offenders that can be investigated.

In short, the prior art methods, or approaches, of analyzing the interference in the network coverage area are generally unsuitable for today's modern wireless network. What is needed is a cost effective method of identifying and analyzing sources of interference in the network that utilizes available qualitative data about the network. A means of identifying sources of interference, or offending cells, along with the disturbed cells in the network would provide numerous advantages.

SUMMARY OF THE INVENTION

The present invention provides a method and system for identifying and analyzing sources of uplink interference in a telecommunications network. With the present invention, the network operator can identify sources of interference and use this information in designing the network or improving performance.

Disclosed in one embodiment is a method of identifying the source of interference in a telecommunications network including one disturbed cell and a plurality of offending cells. The method comprises the steps of recording call events occurring in the offending cells as well as disturbance events occurring in the disturbed cell of the telecommunications network. The recording steps are run in conjunction with each other for the purpose of correlating and computing the two events.

The method also comprises the step of correlating recorded call events with recorded disturbance events as a function of time. The time stamps of the call start attempts (voice channel seizure events) result in Call Event Recordings (CER) for possible adjacent channel/co-channel mobiles. The correlating step is thus followed by a counting step, which comprises identifying the number of disturbance events associated with the disturbed cell. Once a call event is initiated, if sufficient interference is created, a disturbance event in the disturbed cell will be recorded. During the duration of the call event, the disturbance event will remain present. As a result, once the call event ends, the disturbance event will end within an time period delta t ($\Delta t$), therefore triggering the counter step.

The method further comprises the step of computing a distribution of disturbed and offending cells within the telecommunications network as a function of time to obtain a statistical correlation of call events in offending cells and subsequent radio disturbance events resulting in the disturbed cell. This step is performed to identify the possible sources of disturbances within the disturbed cell.

The method also comprises the step of verifying disturbance events. This verification step is performed using free space path loss considerations. All co-channel cells for which calculated signal attenuation indicates they are too far away to generate perceived disturbance events are excluded from further analysis. The propagation model takes into consideration the geographical position, antenna direction, the antenna height, the Effective Radiated Power (ERP), and so forth.

The internal sources of interference on the downlink are also identified using reciprocity. The concept of reciprocity dictates that if the mobiles of the offending cells create interference on the uplink for the disturbed cell, then by the rule of reciprocity, the disturbed cell may disturb the mobiles of the offending cells on the downlink. Therefore, the cells that are disturbed on the uplink are potential candidates to consider as those who disturb their offending cells, on the downlink. Hereinafter, "offender" and "offending cells" may be used interchangeably. Also, "interfered cell" and "disturbed cell" may be substituted for one another.

Technical advantages of the present invention include a less labor intensive method of identifying disturbed cells in the network compared to the drive testing approach. Sources of interference are identified in the shortest amount of time and by use of disturbance data already contained in the network.

Other technical advantages include more accurate identification and analysis of interference sources. The method and system of the present invention utilize empirical measurements based on recorded disturbance events and not predictions. As such, the interference analysis takes into account the behavior of all mobiles within the network rather than a particular mobile event.

BRIEF DESCRIPTION OF THE DRAWINGS

For a more complete understanding of the present invention, including its features and advantages, reference is made to the following detailed description of the invention, taken in conjunction with the accompanying drawings of which.

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
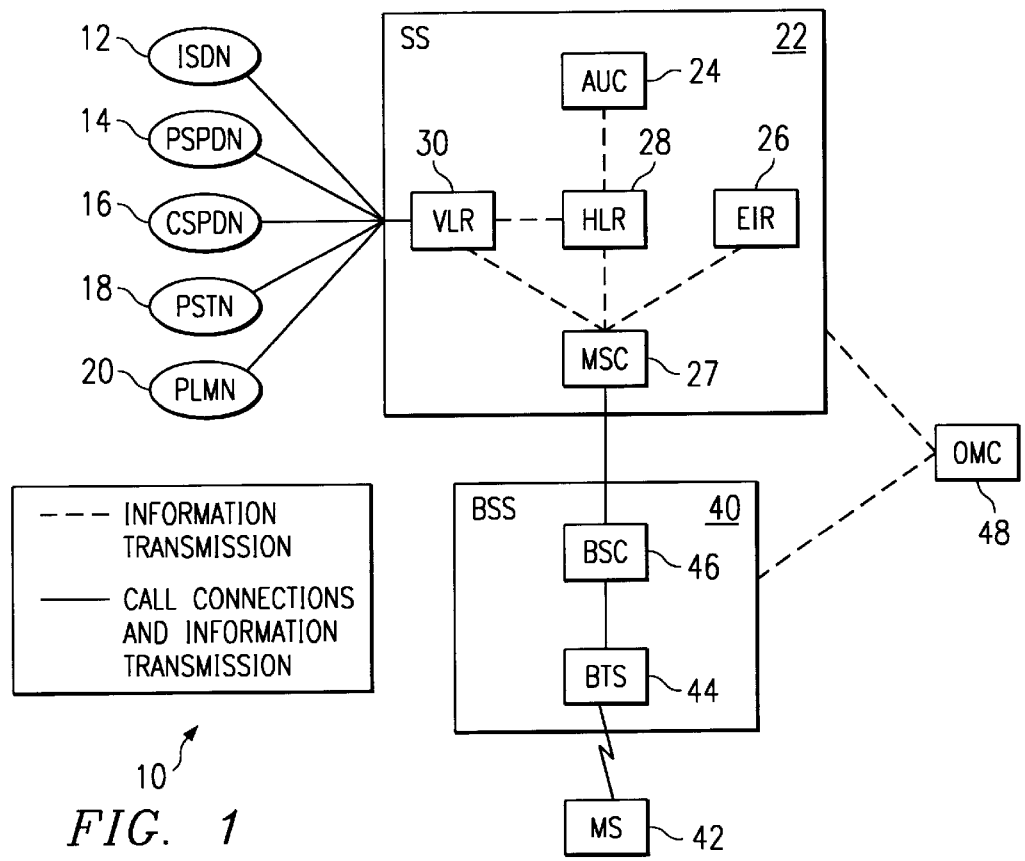
FIG. 1 depicts a telecommunications network in which a preferred embodiment of the present invention may be implemented.

To better understand the invention, reference is made to FIG. 1, wherein a diagram of a telecommunications network, denoted generally as 10, in which a preferred embodiment of the present invention may be implemented is shown. Telecommunications network 10 includes a Switching System (SS) 22 and a Base Station System (BSS) 40. Each of these systems contains a number of functional units, which process information and carry out operations of a functional telecommunications network 10. The functional units themselves may be implemented utilizing various telecommunications hardware devices.

The SS 22 includes a Visitor Location Register (VLR) 30, a Home Location Register (HLR) 28, an Authentication Center (AUC) 24, an Equipment Identity Register (EIR) 26, and a Mobile Switching Center (MSC) 27. The BSS 40 comprises a Base Station Controller (BSC) 46 and a Base Transceiver Station (BTS) 44. An Operations and Maintenance Center (OMC) 48 is connected to equipment present within SS 22 and to BSC 46. The dashed lines in FIG. 1 represent information transmission, while solid lines represent both call connections and information transmission.

Telecommunications network 10 illustrated in FIG. 1 may be realized as a network of neighboring radio cells, which together provide complete coverage for a service area. The service area is the geographic area served by a given telecommunications supplier and the area in which the supplier stands ready to provide its service. Each cell contains a BTS 44 operating on a set of radio channels. These channels differ from the channels utilized by neighboring cells in order to avoid interference.

Each BSC 46 controls a group of BTSs 44. The BSC 46 controls well-known telecommunication functions, such as "Handover" and power control. A number of BSCs (e.g., BSC 46) are served by a MSC 27, which controls calls to and from a Public Switched Telephone Network (PSTN) 18. MSC 27 also controls calls to and from an Integrated Services Digital Network (ISDN) 12, a Public Land Mobile Network (PLMN) 20, a Circuit Switched Public Data Network (CSPDN) 16, and also, various private networks such as, a Packet Switched Public Data Network (PSPDN) 14.

Each unit is actively involved in carrying speech connections between the Mobile Station (MS) 42 and, for example, a subscriber in a fixed network, such as PSTN 18. Because of the extreme difficulties involved in completing an MS 42 terminated telephone call, a number of databases located within the telecommunications network keep track of the MS 42. The most important of these databases is the HLR 28. When a user subscribes to a wireless telecommunications network, such as the telecommunications network 10 depicted in FIG. 1, the user is registered within the HLR 28. The HLR 28 contains subscriber information, such as supplementary services and authentication parameters.

Data describing the location of the MS 42, such as the area (i.e., the MSC area) in which the MS 42 presently resides, is contained within the HLR 28. The MSC area represents that portion of the telecommunications network 10 covered by a single MSC 27. In order to route a call to a mobile subscriber within a telecommunications network, such as the telecommunications network 10 depicted in FIG. 1, the path through the network links to the MSC 27 in the MSC area where the subscriber is currently located. Data describing the location of the MS 42 is thus actively altered as the MS 42 moves from cell to cell within the telecommunications network 10. MS 42 sends location information, via MSC 27 and VLR 30, to an associated HLR 28, which permits MS 42 to receive calls. The AUC 24 is connected to HLR 28, and provides HLR 28 with authentication parameters and ciphering keys utilized for security purposes.

Furthermore, VLR 30 is a database that contains information regarding all mobile stations currently located in the MSC area. When MS 42 roams in a new MSC area, the VLR 30 connected to the MSC 27 in that particular area requests data about the MS 42 from HLR 28. Simultaneously, HLR 28 is provided with the location of the MSC area in which MS 42 resides. If it is later desired to make a call from MS 42, VLR 30 will have at its disposal, all the information necessary for call set-up, without being forced to interrogate HLR 28 each time a call is made. The VLR 30 thus functions as a distributed HLR 28. As such, VLR 30 also contains precise information about the location of the MS 42 in the MSC area.

If an individual subscriber within the fixed network PSTN 18 desires to make a call to a subscriber, an exchange within PSTN 18 connects the call to an MSC 27 equipped with a function commonly known as a "gateway" function. In the telecommunications arts, an MSC 27 having a "gateway" function is commonly referred to as a Gateway MSC (GMSC). The MSC 27 in telecommunications network 10 of FIG. 1 may be implemented as a GMSC. Most MSC's within GSM telecommunications networks function as a GMSC. The GMSC must find the location of the searched MS 42, which can be accomplished by interrogating the HLR 28 where the MS 42 is registered. The HLR 28 then replies with the address of the current MSC area. Thereafter, the GMSC can re-route the call to the correct MSC 27. When the call reaches that MSC 27, the VLR 30 will have additional information regarding the precise location of the MS 42. The call can then be switched through to completion.

The telecommunications network 10 depicted in FIG. 1 may be implemented as a GSM-type network. Those skilled in the art can appreciate that although the present invention is described and illustrated in the context of a GSM network standard, the present invention may also be implemented in accordance with other standards and networks, including AMPS/TMDA utilized in North and South America. The GSM network standard, as discussed herein, is merely presented for illustrative purposes only and is not a limiting feature of the present invention.

Figure 2:
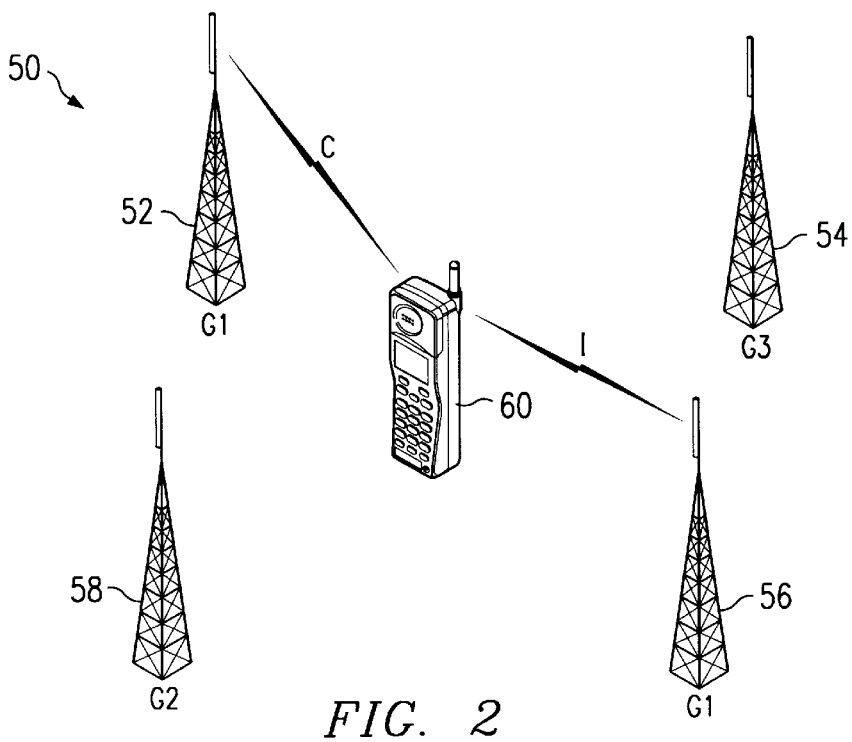
FIG. 2 illustrates downlink adjacent channel interference in a telecommunications network.

FIG. 2 is a block diagram, denoted generally as 50, illustrating downlink adjacent channel interference in a telecommunications network 10. According to the method and system described herein, sources of downlink interference (i.e., offending cells) are identified along with disturbed cells within a network 10 such as that depicted and described in FIG. 1. The call events occurring in offending cells of the telecommunications network 10 and the disturbance events occurring in the disturbed cell of the telecommunications network 10 are first recorded in conjunction with each other. The analysis is then based on correlating call events and thereafter correlating these events with disturbance events. The time correlation generates a list of "offending cells" and "disturbed cells". This correlation then permits the perceived interference in an adjacent/co-channel cell to be associated with a possible source of disturbance. Statistical methods, as opposed to prediction tools, are employed thereafter to determine definite disturbance sources. This allows for a more accurate method and system for identifying and analyzing interference in a telecommunications network 10.

FIG. 2 thus illustrates an example of downlink adjacent channel interference. Radio base stations 52, 54, 58 and 56 are depicted in FIG. 2, along with mobile station 60 (i.e., a cellular telephone). Those skilled in the art can appreciate that mobile station 60 of FIG. 2 is analogous to mobile station 42 of FIG. 1. In the example depicted in FIG. 2, base stations 52, 54, 58 are transmitting with frequencies G1, G2, and G3. Base station 56 transmits on G1 and is therefore utilizing a co-channel to base station 52. Mobile station 60 is currently using G1 and is being served by base station 52 which transmits the carrier signal "C". On the other hand, base station 56 is reusing the same frequency and generates the interference for the mobile station 60.

Mobile station 60 utilizes frequency G1 to receive information from a co-channel base station. Mobile station 60 receives carrier "C" which is transmitted from base station 52 at frequency G1 and interference "I", which is transmitted from a adjacent channel radio base station (i.e., base station 56), also at frequency G1. The radio base station contributing to the interference is termed as the "offender," and the cell in which it resides is referred to as the "offending cell." Mobile station 60, which is affected by adjacent channel interference, is referred to in the parlance utilized herein as "disturbed," and belongs to the "disturbed cell." This was an example of downlink interference where the base station disturbs mobile stations. It is quite easy to understand how uplink interference occurs, i.e., mobiles of an offending cell disturb radio base station receivers on the uplink.

Sources of disturbance are not, however, confined to co-channel radio base stations. Another source of disturbance can be found in adjacent channel base stations, which are still considered as internal disturbance sources. The invention described herein functions in a manner that identifies all possible sources of interference within a telecommunications network 10. Those skilled in the art will appreciate that the terms "disturbance" and "interference" can be utilized interchangeably. Such terms are utilized interchangeably herein.

A "radio disturbance" or "disturbance event" on a downlink channel is also detected for digital calls when sufficient signal strength is correlated in time with degraded speech quality for a period greater than D seconds. The length of time is dependent on the hardware and measurement method utilized. Speech quality is measurable as C/I (i.e., Carrier to Interference ratio) or BER (i.e., Bit Error Rate).

In accordance with a preferred embodiment of the present invention, sources of downlink interference can be analyzed in the following manner. Initially, possible sources of disturbance can be detected by correlating call event recordings with disturbance event recordings. Definite sources of disturbance can then by verified utilizing propagation considerations. Thereafter, a test can be performed to verify if all disturbance events have been correlated with call events. If all disturbance events have been successfully correlated with call events, then a disturbance distribution is computed for each disturbed cell. Improvements are then recommended by trading coverage with interference. Long term improvements to the system can also be recommended based on the disturbance distribution. If, however, all disturbance events are not successfully correlated with call events, then external interference sources are identified. An alternative approach involves identifying the disturbed cells and then concentrating on those identified disturbed cells, rather than the entire telecommunications network 10.

Figure 3:
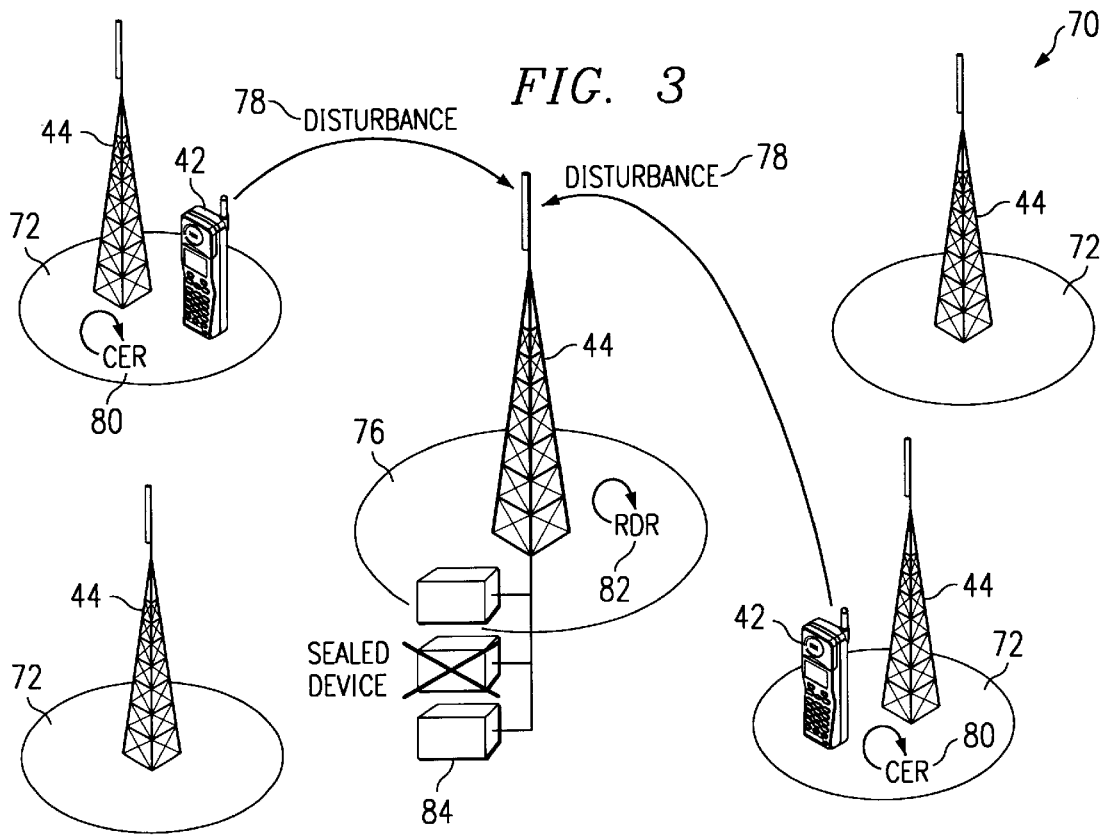
FIG. 3 illustrates Call Event Recording (CER) and Radio Disturbance Recordings (RDR) correlation, in accordance with the preferred embodiment of the is present invention.

FIG. 3 illustrates the first step of detecting possible sources of interference. The Call Event (Traffic) Recording (CER) 80, also referred to as a "cell event recording" occurring in the offending cells 72 and the Radio Disturbance Recordings (RDR) 82 occurring in the disturbed cell 76 of the telecommunications network 10 run in conjunction with each other. RDR is a feature designed to monitor radio disturbance events 78 that affect speech quality in a telecommunications network 10. The degree of radio channel interference in the network is measured by the RDR 82. Network interference from both adjacent channel sites and external radio interference, which in most cases come from sources outside the telecommunications network 10, can be measured. The data recorded will be useful to the network operator in locating and correcting the cause of the disturbance events 78.

While the RDR 82 measures the disturbance seen on a device 84, the CER 80 identifies the call start and stop times for possible offending cells 72. The time stamps of the call start attempts (voice channel seizure events) in CER 80 for possible adjacent channel (or adjacent channel) mobile stations 42. The recorded call events 80 are then correlated with the recorded disturbance events 82. A distribution of disturbed cell 76 and offending cells 72 within the telecommunications network 10 is then computed as a function of time to obtain a statistical correlation of call events 80 in offending cells 72 and subsequent disturbance events 78 resulting in the disturbed cell 76. This is done to identify the possible source of disturbance events 78 within the disturbed cell 76.

One of the most important data components to collect from the method in analyzing interference is the start time of sealing. Sealing of a device 84 occurs due to a adjacent channel mobile station 42 in an offending cell 72 which transmits to the BTS 44 in the disturbed cell 74. As such, the mobile station signal in the offending cell 72 is interfering with the BTS 44 in the disturbed cell 74 because the signal can reach this particular disturbed cell 74, even though it is farther away. Therefore, when the signal is above a certain threshold, then any call which is placed on that channel, or that device, is not going to go through due to too much signal that already exists which has increased.

That is, the interference created from the adjacent/co-channel interference signal reduces the Carrier-to-Interference (C/I) ratio to an unacceptable level. The C/I ratio, as a function of the telecommunications network equipment, goes below some predetermined acceptable level so that there is no reason for allowing a call to be made. As a result, it is a better solution to seal the device 84 rather than have an unacceptable call due to interference. This results in minimal use of network resources. The present invention provides a method and system for identifying sources of radio disturbances resulting from, for example, adjacent channel interference that permit the network operator to determine where the sources of such disturbances are located within the network coverage area.

Figure 4:
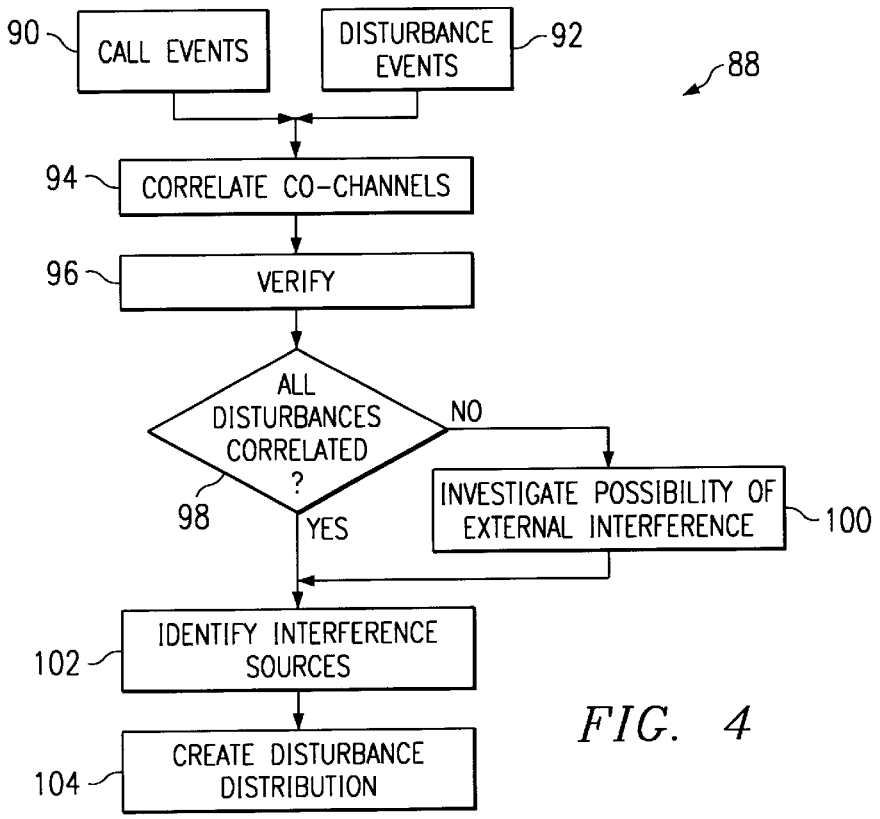
FIG. 4 is a high-level logic flow diagram illustrating process steps for implementing the method and system of the present invention, in accordance with a preferred embodiment.

FIG. 4 illustrates a high-level logic flow diagram 88 illustrating process steps for implementing the method and system of the present invention, in accordance with a preferred embodiment of the present invention. It can be appreciated by those skilled in the art that FIG. 4, as illustrated and described herein, presents a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be born in mind, however, that all of these and similar terms are to be associated with the appropriate physical quantities and are merely convenient labels applied to these quantities.

Further, the manipulations performed are often referred to in terms, such as "designating," "delivering" or "conveying", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a mobile station, or cellular telephone subscriber unit, instructions implementing these method steps. Such instructions can be maintained within a computer memory location of a wireless telephone base station or at a central broadcasting center from which such base stations receive instructions. Implementation of the method described herein is left to the discretion of a particular wireless telephone system designer, whether cellular-based or otherwise.

It can be appreciated by those skilled in the art that the methods described herein can be implemented as a program product (e.g., a control program residing in a computer memory). The program product contains instructions that when executed on a CPU, carry out the operations depicted in the logic flow diagram of FIG. 4. While the present invention is described in the context of a fully functional telecommunications network 10, those skilled in the art will further appreciate that the present invention is capable of being distributed as a program product in a variety of forms. The present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Preferred implementations of the invention can include implementations to execute the method or methods described herein as a program product residing in a memory of microcomputer. Alternatively, a preferred embodiment of the present invention can include a program product residing in a microcomputer memory located at an MSC (e.g., MSC 27 of FIG. 1 herein). The MSC 27 controls system operations in cellular telephone networks, thereby managing calls, tracking billing information, and locating cellular subscribers. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a user's workstation by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Thus, as depicted at step 90 of FIG. 4, call events (or cell traffic events) in a telecommunications network 10 are identified. As illustrated at step 92, disturbance events within the telecommunications network 10 are also identified. Thereafter, as described at step 94, possible sources of disturbance are detected by correlating call event recordings with disturbance event recordings (i.e., identified disturbance events) performed as a function of time. As illustrated next at step 96, definite sources of disturbance are verified utilizing propagation considerations or propagation models. The verifying step is performed using free space path loss considerations. Furthermore, all adjacent channel cells for which calculated signal attenuation indicates that they are too far away to be able to generate perceived disturbance events are excluded from further analysis. Thereafter, as indicated at step 98, a test is performed to determine whether or not all disturbance events have been correlated with call events, in accordance with the present invention described herein.

If all disturbance events are not correlated, then as depicted at step 100, an attempt is made to identify possible sources (adjacent channels or adjacent channels) of external interference. Those skilled in the art will appreciate that disturbance events may not all be attributable to mobile stations associated with the offending cell. External sources can also be the cause of such disturbance events. If all sources of disturbance are not correlated, then the possible sources of external interference must be investigated, as indicated at step 100.

Thereafter, as described at step 102, internal sources of interference are identified on the downlink using reciprocity. If the mobile stations of the offending cells create interference on the uplink for the disturbed cell, then by the rule of reciprocity, the disturbed cell may disturb the mobile stations of the offending cells on the downlink. Therefore, the cells that are disturbed on the uplink are potential candidates to consider those who disturb their offending cells, on the downlink.

Finally, as illustrated at step 104, a disturbance distribution is created. A distribution of disturbed and offending cells within the telecommunications network 10 as a function of time is computed to obtain a statistical correlation of call events in offending cells and subsequent disturbances resulting in the disturbed cell. Such computation and distribution is used to identify the possible source of disturbances that caused the sealing of the sealed device within the disturbed cell. If, however, all disturbance events are correlated, as indicated at step 98, then as described at step 102, interference sources are identified, thereby omitting implementation of the operation described at step 100. Following implementation of the function indicated at step 102, the operation described at step 104 occurs (i.e., disturbance distribution created).

Figure 5:
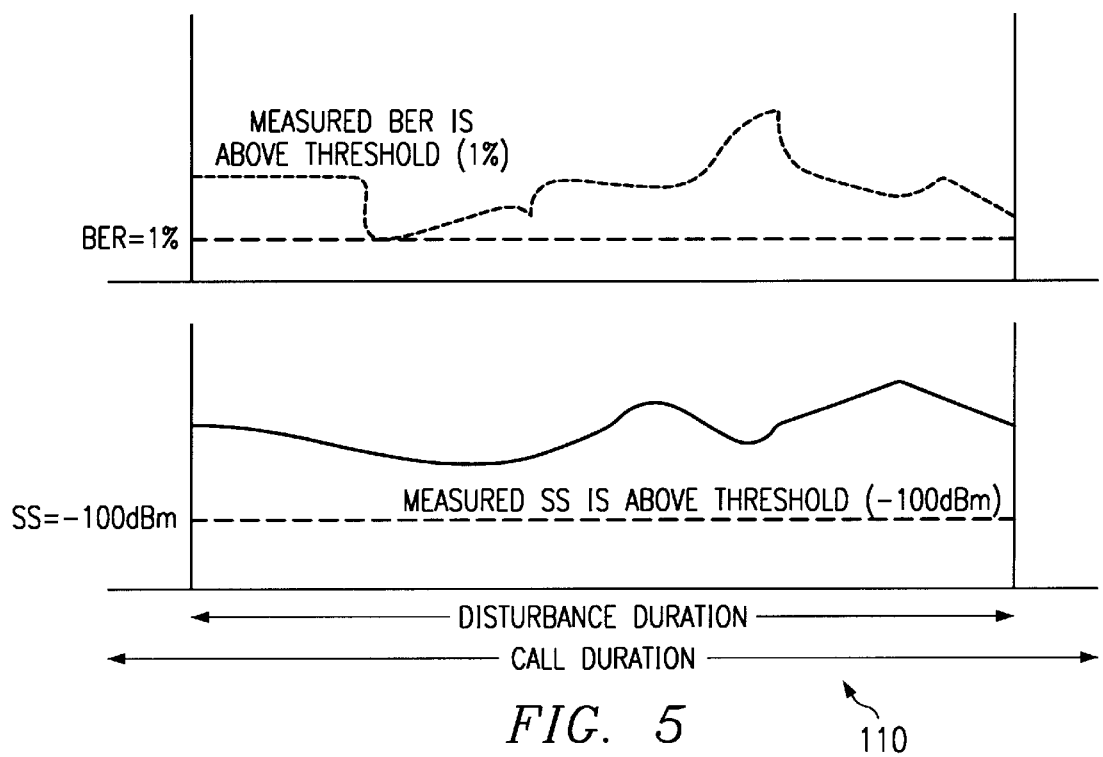
FIG. 5 is a diagram illustrating the time correlation of call events with radio disturbance events, in accordance with a preferred embodiment of the present invention.

FIG. 5 illustrates a graphical diagram 110 illustrating time correlation of call events with radio disturbance events, in accordance with a preferred embodiment of the present invention. In the initial operations associated with the flow diagram of FIG. 4, possible sources of disturbance are identified. This search process correlates voice channel seizure events from call event recordings with the start and stop time of disturbance event recordings. This correlation is accomplished utilizing disturbance events and voice channel seizure time stamps. Adjacent channel information is considered at this stage. FIG. 5 thus illustrates this time correlation. As indicated in the illustration depicted in FIG. 5, a disturbance event is described by a high BER with sufficient signal strength. The BER and signal strength (SS) thresholds can be varied in accordance with network requirements.

Figure 6:
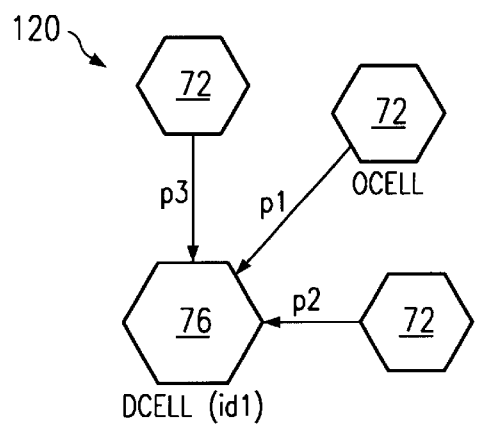
FIG. 6 illustrates the step of verifying definite sources of disturbance, in accordance with the preferred embodiment of the present invention.

To verify definite sources of disturbance, as illustrated in FIG. 6 and denoted generally as 120, propagation considerations (i.e., a propagation model) are utilized. All adjacent channel cells for which calculated signal attenuation indicates that the cells are too far away to be able to generate perceived disturbances are excluded from further analysis. The propagation model takes into consideration the geographical position, antenna direction, antenna height, Effective Radiated Power (ERP), and so forth.

A correlation matrix can thus be utilized to identify possible cells that are potential offenders for each disturbed cell. See Table 1 below:

| disturbed | offender | disfac | dexch | oexch | rdr_s | type | a_ssb | d_ssb |
|---|---|---|---|---|---|---|---|---|
| 11FB | F98B | 568 | QFOT2AX*F7 | QFOT2AX*F7 | 1863 | D | 14 | 10 |
| AF14A | F98B | 92 | QFOT1AX*F7 | QFOT2AX*F7 | 877 | D | 17 | 10 |
| 468B | F98B | 58 | QJCT2AX*F7 | QFOT2AX*F7 | 467 | D | 14 | 10 |
| 478B | F98B | 42 | QFOT2AX*F7 | QFOT2AX*F7 | 1816 | D | 10 | 10 |
| 466A | F98B | 37 | QFOT2AX*F7 | QFOT2AX*F7 | 426 | D | 18 | 10 |
| FF7B | F98B | 24 | QFOT1AX*F7 | QFOT2AX*F7 | 116 | D | 8 | 10 |
| F24B | F98B | 16 | CONT1AX*F7 | QFOT2AX*F7 | 218 | D | 10 | 10 |
| 551B | F98B | 13 | QJCT2AX*F7 | QFOT2AX*F7 | 386 | D | 16 | 10 |

Table 1 illustrates a list of disturbed cells 76 and possible offending cells 72. Originally, the list created is done with respect to the disturbed cells 76. The correlation and verification process then allows us to reverse the list and create to another matrix ranked by the offending cells 72 rather than disturbed cells 76.

A disclosed embodiment of the present invention involves identifying cells with interference problems by searching for those cells that have a high BER (i.e. greater than 1%) for good signal strength. Less than 5% of samples typically have signal strengths less than −100 dBM. As a result of identifying those cells that have a high BER, a list of such cells is compiled. These cells are identified via an associated MSC 42. A determination is then made as to which devices within these cells also have interference problems by observing the cells contained within the compiled cell list. In addition, start and stop time for all calls having a BER greater than 1% and a signal strength greater than −100 dBM are also identified.

If too many telecommunications events (e.g., start and stop times) are identified, a re-correlation can be performed utilizing a greater delta value. A list of devices having high BER in each of the disturbed cells 76 is then provided, in addition to a listing of disturbance events, including stop and start time, and a BER distribution and signal strength distribution. Thereafter, channel numbers associated with devices having high BER are identified. A list of channel numbers, along with data describing the distribution of such channel numbers, is also determined, including the cells within which such channel numbers are located.

Next, adjacent/co-channel disturbance analysis, as described herein, is performed for the start and stop times identified earlier for the disturbed devices. Given the channel numbers identified earlier, adjacent channels are identified in which a call in progress was completely overlapped with a disturbance event. As a result of this calculation, a table of disturbed and offending cells 72, 76 is created, including a determination of how many correlations were found for each disturbed and offending pair. A disturbance distribution created by the possible offending cells 72 is also created. This adjacent channel disturbance analysis can be repeated for adjacent channels and a table with adjacent channel offenders can also be created, similar to the table of disturbed and offending cells.

As a result of these calculations, possible offending cells 72 can be identified having the highest number of correlations. In addition, a determination can also be performed as to whether the offender's signal can possibly interfere with the disturbed cells 76. Thus, a list of possible offenders on the downlink can be compiled and this information can be utilized for short and long term recommendations.

Figure 7:
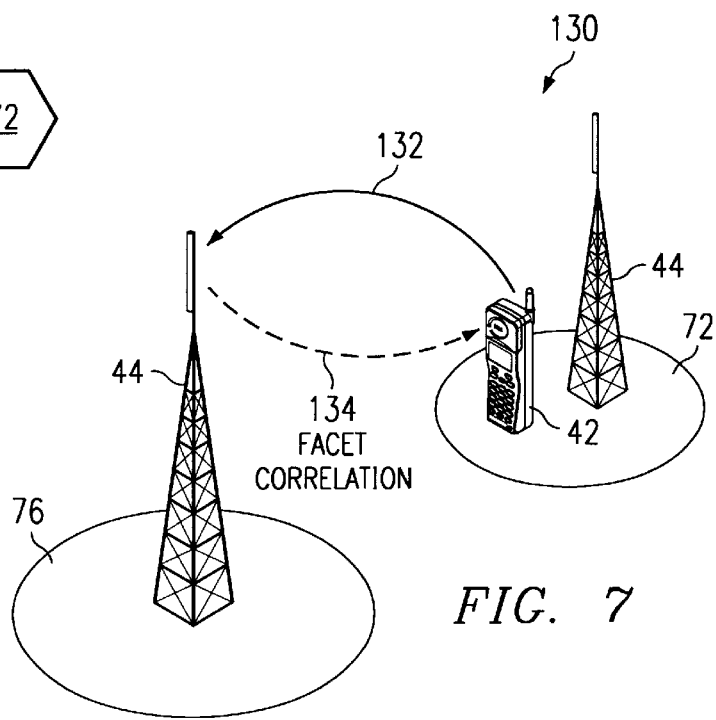
FIG. 7 illustrates the concept to reciprocity as is applied to the present invention.

With reference to FIG. 7, the concept of reciprocity is illustrated and denoted generally as 130. The internal sources of interference on the downlink 134 are also identified on this basis using the notion of reciprocity. That is, if the mobile stations 42 of the offending cell 72 create interference, or disturbance events on the uplink 132 for the disturbed cell 76, then by the rule of reciprocity, the disturbed cell may disturb the mobile stations 42 of the offending cells on the downlink 134. Therefore, the cells that are disturbed 76 on the uplink 132 are potential candidates to consider as those who disturb their offending cells 72, on the downlink 134.

Furthermore, the disturbance events may not all be attributable to mobile stations 42 of the offending cells 72. External sources could also be the culprits of such interference. As such, if all sources of disturbance are not correlated, then the possibility of external interference will not be considered.

Those skilled in the art can thus appreciate that the invention described herein explains a method and system for identifying sources of uplink and downlink interference in a telecommunications network. By either reducing the offending radio base station output power or altering the frequency plan, interference can be mitigated. The method and system described herein are based on measurements, which provide an advantage over prediction tools. In addition, the method and system presented herein utilizes "switch statistics" and therefore, does not involve costly drive testing procedures. In short, utilizing the method and system described herein results in improvements in the performance of a telecommunications network.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. In a telecommunications network including one disturbed cell containing at least one sealed device and a plurality of offending cells, a method of identifying the source of interference in the disturbed cell comprising the steps of:
   recording call events occurring in offending cells of the telecommunications network;
   recording disturbance events occurring in the disturbed cell of the telecommunications network;
   correlating recorded call events with recorded disturbance events; and
   computing a distribution of disturbed and offending cells within the telecommunications network as a function of time to obtain a statistical correlation of call events in offending cells and subsequent disturbances resulting in said disturbed cell to identify the possible source of disturbances that caused the sealing of the sealed device within the disturbed cell.

2. The method according to claim 1 wherein said steps of recording call events occurring in offending cells and recording disturbance events occurring in the disturbed cell are run in conjunction with each other.

3. The method according to claim 1 wherein said correlating step is performed as a function of time.

4. The method according to claim 1 wherein said correlating step is followed by a counting step, said counting step comprising the step of identifying the number of disturbance events associated with the disturbed cell.

5. The method according to claim 4 wherein said counting step is performed within a delta time once a call event ends causing the disturbance events to end.

6. The method according to claim 1 wherein said correlating step is followed by the step of attempting (voice channel seizure events) for possible adjacent channel (or adjacent channel) mobiles in Call Event Recordings (CER), said attempting step performed by the time stamps of the call start.

7. The method according to claim 1 further comprising the step of verifying said disturbance events, said verifying step performed using free space path loss considerations.

8. The method according to claim 7 wherein said verifying step further comprises the step of excluding from further analysis all adjacent channel cells for which calculated signal attenuation indicates that they are too far away to be able to generate perceived disturbance events.

9. The method according to claim 1 further comprising the step of identifying internal sources of interference on the downlink using reciprocity.

10. The method according to claim 9 wherein said identifying step is followed by the step of disturbing the mobiles of the offending cells on the downlink if the mobiles of the offending cells create interference on the uplink for the disturbed cell via reciprocity.

11. In a telecommunications network including one disturbed cell containing at least one sealed device and a plurality of offending cells, a system for identifying the source of uplink interference in the disturbed cell comprising:
   a means for recording call events occurring in offending cells of the telecommunications network;
   a means for recording disturbance events occurring in the disturbed cell of the telecommunications network;
   a means for correlating recorded call events with recorded disturbance events; and
   a means for computing a distribution of disturbed and offending cells within the telecommunications network as a function of time to obtain a statistical correlation of call events in offending cells and subsequent disturbances resulting in said disturbed cell to identify the possible source of disturbances that caused the sealing of the sealed device within the disturbed cell.

12. The system according to claim 11 wherein said means for recording call events occurring in offending cells and said means for recording disturbance events occurring in the disturbed cell are configured to run in conjunction with each other.

13. The system according to claim 11 wherein said means for correlating is configured to execute as a function of time.

14. The system according to claim 11 wherein said means for correlating further includes a means for counting adapted to identify the number of disturbance events associated with the disturbed cell.

15. The system according to claim 14 wherein said means for counting is configured to execute within a delta time once a call event ends causing the disturbance events to end.

16. The system according to claim 11 wherein said means for correlating further comprises a means for attempting (voice channel seizure events) for possible adjacent channel (or adjacent channel) mobiles in Call Event Recordings (CER), said means for attempting configured to execute via time stamps of the call start.

17. The system according to claim 11 further comprising a means for verifying said disturbance events, said means for verifying configured to perform using free space path loss considerations.

18. The system according to claim 17 wherein said means for verifying further comprises a means for excluding from further analysis all adjacent channel cells for which calculated signal attenuation indicates that they are too far away to be able to generate perceived disturbance events.

19. The system according to claim 11 further comprising a means for identifying internal sources of interference on the downlink using reciprocity.

20. The system according to claim 19 wherein said means for identifying further includes a means for disturbing the mobiles of the offending cells on the downlink if the mobiles of the offending cells create interference on the uplink for the disturbed cells via reciprocity.

21. In a telecommunications network including one disturbed cell containing at least one sealed device and a plurality of offending cells, a program product for identifying the source of uplink interference in the disturbed cell comprising:
   instruction means residing in a computer for recording call events occurring in offending cells of the telecommunications network;
   instruction means residing in a computer for recording disturbance events occurring in the disturbed cell of the telecommunications network;
   instruction means residing in a computer for correlating recorded call events with recorded disturbance events; and
   instruction means residing in a computer for computing a distribution of disturbed and offending cells within the telecommunications network as a function of time to obtain a statistical correlation of call events in offending cells and subsequent disturbances resulting in said disturbed cell to identify the possible source of disturbances that caused the sealing of the sealed device within the disturbed cell.

22. The program product according to claim 21 wherein said instruction means residing in a computer for recording call events occurring in offending cells and instruction means residing in a computer for recording disturbance events occurring in the disturbed cell are configured to run in conjunction with each other.

23. The program product according to claim 21 wherein said instruction means residing in a computer for correlating is configured to perform as a function of time.

24. The program product according to claim 21 wherein said instruction means residing in a computer for correlating further comprising an instruction means residing in a computer for counting, said means for counting adapted to identify the number of disturbance events associated with the disturbed cell.

25. The program product according to claim 24 wherein said instruction means residing in a computer for counting is configured to perform within a delta time once a call event ends causing the disturbance events to end.

26. The program product according to claim 21 wherein said instruction means residing in a computer for correlating further comprises an instruction means residing in a computer for attempting (voice channel seizure events) for possible adjacent channel (or adjacent channel) mobiles in Call Event Recordings (CER), said instruction means residing in a computer for attempting configured to perform via time stamps of the call start.

27. The program product according to claim 21 further comprising instruction means residing in a computer for verifying said disturbance event, said instruction means residing in a computer for verifying configured to perform using free space path loss considerations.

28. The program product according to claim 27 wherein said instruction means residing in a computer for verifying further comprises instruction means residing in a computer for excluding from further analysis all adjacent channel cells for which calculated signal attenuation indicates that they are too far away to be able to generate perceived disturbance events.

29. The program product according to claim 21 further comprising instruction means residing in a computer for identifying internal sources of interference on the downlink using reciprocity.

30. The program product according to claim 29 wherein said instruction means residing in a computer for identifying is followed by instruction means residing in a computer for disturbing the mobiles of the offending cells on the downlink if the mobiles of the offending cells create interference on the uplink for the disturbed cell via reciprocity.

* * * * *